Patented Aug. 15, 1950

2,518,677

UNITED STATES PATENT OFFICE 2,518,677

SEPARATION OF HYDROCARBONS USING UREA COMPLEXES

Philip J. Garner, Hooton, Wirral, and Leslie N. Goldsbrough and Thomas B. Buyers, Thornton-le-Moors, England, assignors to Shell Development Company, San Francisco, Calif., a corporation of Delaware No Drawing. Application May 10, 1949, Serial No. 92,518. In Great Britain July 7, 1948

16 Claims. (Cl. 260—676)

1

This invention relates to improvements in a fractionation process. More particularly, it is concerned with improvements for the fractionation of hydrocarbon mixtures.

A separation technique which can lead to the segregation of normal and branched chain hydrocarbon structures has considerable possibilities in the petroleum industry where mixtures of hydrocarbons are frequently encountered which are difficult and expensive to fractionate by physical methods. The desirability of this type of segregation in the petroleum industry is frequently emphasized by the fact that the commercial possibilities of normal and branched chain hydrocarbons are often sharply differentiated; for example, branched chain hydrocarbons are often advantageous in aviation or motor gasolines whereas straight chain hydrocarbons may be of marked value in Diesel oils.

It is known that mixtures of hydrocarbons containing both straight chained and branched or cyclic compounds may be fractionated by treatment with urea. This treatment results in the preferential formation of crystalline molecular complexes between straight chain hydrocarbons and urea to the substantial exclusion of any reaction with branched chain materials. Hence, this phenomenon may be utilized, especially by the petroleum industry, for the preparation of high octane gasoline, low pour point lubricating oils and for other purposes where the isolation of straight chain materials from their mixtures with branched chain or cyclic compounds is desirable.

The process essentially comprises treatment of the hydrocarbon mixture with an aqueous solution of urea for a time sufficient to permit formation of the crystalline molecular complexes, and subsequently isolating the crystals by such means as filtration or centrifuging. It has been found, however, that the crystals are oleophilic in character and, due to this property and to their finely divided state, tend to associate with the unreacted hydrocarbon phase, rather than settling into the aqueous phase, as would be more desirable.

In regenerating normal paraffins from their molecular urea complexes, difficulty is sometimes experienced in obtaining a clean separation between the regenerated hydrocarbon phase and the aqueous regenerating medium. In order to obtain the maximum yield of extracted product, a sharp separation of these two phases is highly desirable.

It is an object of the present invention to im-

2 prove the above-described process for the fractionation of hydrocarbon mixtures. It is another object of the present invention to facilitate the separation of crystalline molecular complexes from the described reaction mixtures. Other objects will become apparent from the following description of the present invention.

In accordance with the present invention, it has been found that the addition of a water-soluble wetting agent together with a water-soluble, substantially neutral electrolyte causes the crystalline molecular complexes of urea and hydrocarbons to associate with the aqueous phase, and simultaneously depresses emulsification of the remaining liquid hydrocarbon phase in the aqueous medium. Still, in accordance with this invention, it has been found that the addition of these two types of agents to the reaction mixture may be carried out either before or after the formation of the complex, the selection of one of these alternatives being dependent on factors specified hereinafter.

Hydrocarbon mixtures

The hydrocarbon mixtures to which the present invention applies may be natural mixtures or those obtained during synthetic processes, as well as any combinations thereof. The process is especially applicable to petroleum fractionations, but also may be utilised in the purification and fractionation of isomerisation mixtures, polymerisation mixtures, hydrogenation products and other mixtures of materials which require purification or fractionation. It is known that urea forms crystalline molecular complexes with straight chain hydrocarbons having at least about four carbon atoms. The ease of formation appears to increase with increasing molecular weight of the hydrocarbon. Within the range $C_8$ to $C_{24}$ the ratio of urea to hydrocarbon is roughly one molecule of urea for each carbon atom in the hydrocarbon chain. This ratio decreases slightly as the hydrocarbon chain increases.

It is known that the present process applies to the fractionation of straight chain oxygen-containing organic compounds in general, such as alcohols, ethers, esters, acids, aldehydes, ketones, etc. However, the process will be described with particular reference to its use in the fractionation of hydrocarbon mixtures. Hydrocarbons to which it applies include normal octane, decane, tetradecane, etc. The process is especially valuable for the fractionation of mixtures of fatty acids and their derivatives, since it has been found that urea preferentially forms crystalline molecular complexes with straight chain compounds having saturated molecules; hence, it is possible to treat a mixture of fatty acids or esters or esters derived from cottonseed, soybean, fish or linseed oils and the like so as to isolate relatively saturated acids and to leave behind a mixture of relatively unsaturated acids.

The urea solution

While crystalline urea may be utilized in the formation of the crystalline molecular complexes described above, for the purpose of the present invention it is necessary to employ an aqueous urea solution. Preferably, the solution is substantially saturated at all times so as to promote maximum reaction between urea and straight chain hydrocarbons; however, more dilute solutions may be used in order to conduct preferential formation between urea and a relatively active hydrocarbon in the presence of a relatively less active hydrocarbon.

While the solution is essentially aqueous, it may contain modifying diluents or solvents which are miscible with the urea solution and also to a minor extent with the hydrocarbon mixture. Such modifiers promote the rate and extent of complex formation. Included among these are methyl alcohol, isopropyl alcohol, secondary butyl alcohol, methyl isobutyl ketone and acetone. Up to about 30% by weight of the aqueous solution of these organic diluents may be employed.

In order to promote maximum reaction, a substantial excess of urea solution should be used, commensurate with the amount of reactive material which is present.

The wetting agent

The wetting agents which may be used in improving the separation of crystalline complexes from the reaction mixtures may be either anion-active, cation-active, or of the non-electrolytic type. Preferably, the anion-active type is employed. Wetting agents in general have at least one radical containing 8 or more carbon atoms and not more than 64 carbon atoms per molecule. The hydrophobic portions of the wetting agents may be aliphatic, alicyclic, alkyl alicyclic, aromatic arylalkyl or alkylaromatic. The preferred types of wetting agents are those in which the molecule contains a long uninterrupted carbon chain containing from 8 to 22 carbon atoms in length. Examples of the suitable anion-active wetting agents include the alkali metal hydrocarbon sulfates, such as sodium cetyl sulfate, as well as the organic ammonium sulfonates, such as ammonium lauryl sulfonate, and the hydrocarbon sulfonates, such as dodecylbenzene sulfonate and octadecylbenzene sulfonate. Other suitable sulfo wetting agents include sodium dodecyltoluene sulfonate and sodium dioctylsulfosuccinate.

The preferred class of anion-active wetting agents includes especially the alkali metal alkyl sulfates, such as sodium hexyl-2-sulfate, sodium decyl-2-sulfate and sodium tetradecanyl-2-sulfate. The sulfate radical may be present in any position from one to six and preferably in a position greater than one.

Suitable cation-active wetting agents include cetyl piperidinium chloride, trimethylheptadecyl ammonium chloride, octadecylamine acetate and 2 - heptadecyl - 3 - diethylenediamino - amyldecylene diacetate.

The non-electrolytic wetting agents include, for example, the oleic acid ester of nonaethylglycol, diglycol laurate, etc. Other examples of these wetting agents suitable for the present purpose are included in the various lists of available wetting agents published periodically in Industrial Engineering Chemistry, such as volume 31, page 66, January 1939, and as revised in subsequent editions.

In order to be effective for the present use, the wetting agents may be present in amounts from about 0.04 to about 1.0 gram per liter of aqueous urea solution. Preferably, the sodium alkyl sulfates are employed in concentrations from about 0.2 to 0.6 gram per liter of urea solution. The alkyl aryl sulfonates are most effective in concentrations from about 0.04 to 0.3 gram per liter of a urea solution.

If used in excessive amounts above about 1 gram per liter of urea solution, the beneficial effects of the presence of the wetting agent progressively decrease, due to emulsifying or frothing tendencies. In fact, even within the ranges given above, most of the wetting agents exhibit emulsifying tendencies which, if not modified by the presence of the electrolytes described hereinafter, would nullify their presence and, in fact, make their use objectionable. It has been found that the use of wetting agents alone in any concentration tends to promote emulsification of unreacted liquid hydrocarbons in the aqueous phase and thus to prevent separation of the liquid hydrocarbons from the aqueous solutions. Hence, even though the wetting agent performs its primary function of causing the crystalline molecular complexes to associate with the aqueous phase, it simultaneously promotes undesirable emulsification which must be overcome.

The electrolyte

In order to overcome the emulsifying tendencies of the wetting agents employed, it has been found possible to add substantially neutral water-soluble electrolytes in amounts varying from about 10 grams per liter to about 60 grams per liter of urea solution. The term "substantially neutral water-soluble electrolytes" is meant to include electrolytes which exhibit only a minor effect upon the pH of the aqueous system. It has been found that molecular complex formation may be carried out at pH's between about 2.5 and 9.5. Any electrolyte which, when used in the concentrations given above, does not change the pH of the aqueous phase to a point below or above this range will be suitable for correcting the emulsifying tendencies of wetting agents and is included in the above definition. Especially preferred electrolytes include ammonium, alkali metal and alkaline earth metal water-soluble salts, such as chlorides, nitrates, nitrites, sulfates, chromates, phosphates, carbonates, and acetates. The usual alkali metal salts are the sodium and potassium salts, but lithium, rubidium and cesium may be employed. Among the alkaline earth metal salts, calcium is preferred, followed by magnesium, barium or strontium. Ammonium chloride has been found to be especially effective, particularly when used in concentrations from about 10 to 30 grams per liter of urea solution. Other suitable electrolytes include especially ammonium sulfate, potassium chromate, sodium chloride, sodium nitrite, calcium chloride, ammonium acetate and ammonium carbonate. Sodium sulfate, potassium nitrate and sodium phosphate, as well as sodium carbonate, may be used in conjunction with the wetting agents described above.

The amount of electrolyte to be employed varies to a certain degree with the type and concentration of the wetting agent in the urea solution. A rough factor may be established as follows: The concentration in grams per litre of urea solution of the electrolyte is divided by the concentration of the wetting agent in grams per liter of urea solution to give a factor varying from about 10 to 400, preferably below 100. It has been found that within this range optimum results are obtained with respect to separation of liquid hydrocarbon phase from the aqueous phase with simultaneous settling of the molecular urea hydrocarbon complexes into the aqueous phase.

The present invention can be carried out either in a continuous process or as a batch process and the optimum operating conditions in any given case depend in part on which of these alternatives is chosen. Continuous operation has obvious commercial attractions and can for instance be practised as will hereinafter appear by introducing urea solution, wetting agent and electrolyte in admixture into the liquid hydrocarbon mixture under treatment. After separation of an aqueous phase containing suspended hydrocarbon-urea complexes and recovery of the hydrocarbon set free by decomposition of these complexes, urea solution thereby regenerated can be returned to the system for further extraction.

The point at which the wetting agent and electrolyte are added can affect the time necessary to complete reaction between straight chain hydrocarbons and urea and the physical characteristics of the complexes, thus in some cases one minor disadvantage which occurs upon the addition of a wetting agent to a urea hydrocarbon is the overdue lengthening of the period necessary for complete reaction between straight chain hydrocarbons and urea. This apparently, but not necessarily, appears to be caused by the hydrophilic surface of the wetted complexes and results in extension of the necessary reaction time. In such cases and notably when batch operation is involved it may be found advantageous to add the wetting agent after complex formation since its function is desirable during the subsequent separation steps, rather than during complex formation. Hence, one phase of the present invention comprises formation of crystalline molecular complexes between urea and straight chain hydrocarbons in the presence of water followed by addition of a wetting agent to the system. The time of addition of the water-soluble electrolyte appears to be immaterial, but it is advantageously added as part of the solution containing a wetting agent subsequent to complex formation and prior to the separation steps which follow.

It is to be noted on the other hand that in some cases a prolonged reaction period has been found to result in a favorable modification of the crystalline complex in that a more easily handled crystalline form is obtained when slower reaction rates occur. The crystalline complex is more uniform and finely divided and has been found to be more easily pumped and otherwise transported than when the complexes are in the form of crystals having elongated shapes. Hence the point at which the wetting agent and electrolyte are to be added is chosen with these alternative factors in consideration.

Subsequent to the addition of wetting agent and electrolyte and also subsequent to complex formation, the reaction mixture is conducted to a separation zone. At this point, the mixture is allowed to separate into an unreacted hydrocarbon phase and an aqueous phase containing suspended normal hydrocarbon-urea complexes. It is at this stage that the presence of the wetting agent and the electrolyte is effective. In their absence, the mixture is more or less emulsified and requires extensive purification and fractionation treatments. In the presence of wetting agents together with electrolytes, however, it is possible to obtain clean separation and in some cases to separate the crystals, aqueous urea solution and hydrocarbon phase from each other merely by gravity means.

After separation of the crystalline molecular complexes, the latter are subjected to decomposition conditions for the recovery of straight chain hydrocarbons therefrom and for the regeneration of urea to be used in further fractionations. Suitable decomposition means comprise heating in the presence of water or dilute urea solution or heating in the presence of a hydrocarbon solvent. The examples which follow illustrate the process of the present invention.

*Example I.—Batch process*

A $C_8$ cracked wax distillate having a refractive index $n_D^{20}$ 1.4140 and a boiling range of 117–125° C. at 760 mm. Hg was treated at 10° C. with an excess of an extraction mixture comprising an aqueous solution of urea saturated at 25° C. and 10% (calculated on the volume of the urea solution) of industrial methyl alcohol.

A thick slurry composed of urea-normal hydrocarbon complex and the liquids present was formed and no clear separation either of phases or of urea-normal hydrocarbon complex took place until 0.1% (calculated on the volume of the urea solution) of a 20% aqueous solution of sodium secondary alkyl sulfates (having alkyl radicals between $C_8$ and $C_{18}$) was added, whereupon the mixture became much more liquid in character and the urea-normal hydrocarbon complex accumulated in the aqueous layer in the form of a very fine suspension.

The addition of 60 grams of ammonium phosphate per liter of urea solution produced sharp separation between the aqueous phase and the oily phase containing branched chain hydrocarbons of refractive index $n_D^{20}$ 1.4280. The aqueous phase containing the suspended complexes was withdrawn and heated to 45° C. at which temperature the urea-normal hydrocarbon complex compound decomposed to give an upper oily phase of normal hydrocarbons (in this case essentially octene-1) with $n_D^{20}$ 1.4095, sharply separated from a lower aqueous phase which could easily be withdrawn.

*Example II.—Continuous process*

One part of a $C_8$ cracked wax distillate of B. P. range 117–125° C. at 760 mm. Hg and refractive index $n_D^{20}$ 1.4140 was contacted at 5° C. with 10–15 parts of an aqueous solution of urea saturated at 25° C. to which had been previously added 5% by volume 2-butanol, 0.2% by volume of a 20% solution of a mixture of sodium $C_8$-$C_{12}$ alkyl sulfates and 20 grams per liter of ammonium chloride. To initiate the reaction 1% of the complex obtained by filtering the aqueous phase of Example I was added. After contacting for 1½ to 3 hours, the upper residual oil phase ($n_D^{20}$ 1.4290–1.4300) was separated by gravity flow from the aqueous phase containing the suspended urea-normal hydrocarbon complex.

The separated aqueous phase containing suspended complexes was heated to 50° C. to decompose the complex compound to give an upper oily phase having a refractive index of $n_D^{20}$ 1.4095 and a lower aqueous phase which was easily separated by decantation and returned as the extractive mixture for the treatment of further quantities of cracked wax distillate.

*Example III.—Continuous process*

One part of a $C_{13}$ cracked wax distillate of B. P. range 229–235° C. at 760 mm. Hg and refractive index $n_D^{20}$ 1.4408 was contacted at 15° C. with 8–12 parts of an aqueous urea solution saturated at 25° C. and to which had previously been added 10% by volume acetone, 0.2% by volume of a 20% solution of a mixture of sodium $C_8$-$C_{12}$ alkyl sulfates and 40 grams per liter of ammonium chloride. The reaction was initiated in the same way as in Example II. After contacting for about four hours, the upper residual oil phase ($n_D^{20}$ 1.4480) was separated by gravity flow from the aqueous phase containing the suspended urea-normal hydrocarbon complex.

The separated aqueous phase was heated to 60° C. to decompose the complex compound to give an upper oily phase of refractive index $n_D^{20}$ 1.4345 (in this case a concentrate of normal $C_{13}$ olefines) and a lower aqueous phase which was easily withdrawn and returned as the extractive mixture for the treatment of further quantities of cracked wax distillate.

*Example IV.—Continuous process*

One part of a $C_8$-$C_{18}$ cracked wax distillate of $n_D^{20}$ 1.4430 B. P. 120–320° C. at 760 mm. Hg was contacted at 16° C. with 8–12 parts of an aqueous urea solution saturated at 30° C. and to which had previously been added 10% by volume of isopropyl alcohol, 1.0% of a 20% solution of a mixture of sodium iso-octyl sulfates and 20 grams per liter of ammonium chloride. After contacting for 4–5 hours, the upper residual oil phase $n_D^{20}$ 1.4480 was separated by gravity flow from the aqueous phase containing the suspended complex which was then decomposed at 60° C. and the extract oil ($n_D^{20}$ 1.4320 and consisting of a concentrate of straight chain $C_8$-$C_{18}$ olefinic hydrocarbons) separated, the aqueous urea solution with its additions was returned to the earlier stages of the process for reuse. The reaction was initiated as in Example II.

*Example V.—Continuous process*

One part of a $C_9$-$C_{17}$ kerosine fraction of $n_D^{20}$ 1.4450 B. P. 140–280° C. at 760 mm. Hg was contacted at 15° C. with 4–6 parts of an aqueous urea solution saturated at 25° C. and to which had previously been added 10% vol. isopropyl alcohol, 0.2% of a 20% solution of a mixture of sodium $C_8$-$C_{12}$ alkyl sulfates and 30 grams per liter of ammonium acetate. After contacting for 2–3 hours, the upper residual oil phase ($n_D^{20}$ 1.4460) was separated by gravity flow from the aqueous phase containing the suspended complex which was then decomposed at 60° C. and the extract oil $n_D^{20}$ 1.4290, comprising 10% of the original oil and consisting of a concentrate of straight chain hydrocarbons) separated, the aqueous urea solution was returned to the earlier stages of the process for reuse. The reaction was initiated as in Example II.

Complex formation between urea and the normal hydrocarbons as described in this example may be accelerated especially in a continuous process by continuously recycling a small proportion of the outlet slurry containing suspended crystalline molecular complexes. It has been found that either in continuous or batch processes the presence of pre-formed molecular complexes reduces the initial time required for complexes to be formed.

The invention claimed is:

1. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of sodium tetradecanyl-2-sulfate and from 10 to 60 grams per liter of ammonium acetate, said sulfate and acetate promoting association of the complex crystals with the aqueous solution and aiding in depressing emulsification.

2. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of dodecyl benzene sulfonate and from 10 to 60 grams per liter of ammonium sulfate, said sulfonate and sulfate promoting association of the complex crystals with the aqueous solution and aiding in depressing emulsification.

3. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of sodium decyl-2-sulfate and from 10 to 60 grams per liter of ammonium chloride, said sulfate and chloride promoting association of the complex crystals with the aqueous solution and aiding in depressing emulsification.

4. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of an alkali metal alkyl sulfate and from 10 to 60 grams per liter of a substantially neutral water-soluble electrolyte, said sulfate and electrolyte promoting association of the complex crystals with the aqueous solution and aiding in depressing emulsification.

5. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 60 grams per liter of an ammonium salt of a mineral acid, said wetting agent and salt promoting association of the complex crystals with the aqueous solution and aiding in depressing emulsification.

6. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 60 grams per liter of a substantially neutral water-soluble electrolyte, said wetting agent and electrolyte promoting association of the complex crystals with the aqueous solution and aiding in depressing emulsification, said additions being made subsequent to said crystalline complex formation.

7. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 60 grams per liter of a substantially neutral water-soluble electrolyte, said wetting agent and electrolyte promoting association of the complex crystals with the aqueous solution and aiding in depressing emulsification.

8. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.2 to 0.6 gram per liter of the urea solution of an alkali metal alkyl sulfate and from 10 to 60 grams per liter of substantially neutral water-soluble electrolyte, said sulfate and electrolyte promoting association of the complex crystals with the aqueous solution and aiding in depressing emulsification.

9. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 30 grams per liter of an ammonium salt of a mineral acid, said wetting agent and salt promoting association of the complex crystals with the aqueous solution and aiding in depressing emulsification.

10. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble hydrocarbon sulfonate and from 10 to 60 grams per liter of a substantially neutral water-soluble electrolyte, said hydrocarbon sulfonate and electrolyte promoting association of the complex crystals with the aqueous solution and aiding in depressing emulsification.

11. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble anion-active wetting agent and from 10 to 60 grams per liter of a substantially neutral water-soluble electrolyte, said wetting agent and electrolyte promoting association of the complex crystals with the aqueous solution and aiding in depressing emulsification.

12. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble cation-active wetting agent and from 10 to 60 grams per liter of a substantially neutral water-soluble electrolyte, said wetting agent and electrolyte promoting association of the complex crystals with the aqueous solution and aiding in depressing emulsification.

13. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble non-electrolytic wetting agent and from 10 to 60 grams per liter of a substantially neutral water-soluble electrolyte, said wetting agent and electrolyte promoting association of the complex crystals with the aqueous solution and aiding in depressing emulsification.

14. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 60 grams per liter of a substantially neutral water-soluble alkali metal salt of a mineral acid, said wetting agent and alkali metal salt promoting association of the complex crystals with the aqueous solution and aiding in depressing emulsification.

15. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 60 grams per liter of substantially neutral water-soluble alkaline earth metal salt of a mineral acid, said wetting agent and alkaline earth metal salt promoting association of the complex crystals with the aqueous solution and aiding in depressing emulsification.

16. In a process for the separation of straight chain hydrocarbons from their fluid mixture with non-straight chain hydrocarbons, wherein an aqueous urea solution and said mixture are contacted to selectively form crystalline molecular complexes of urea with straight chain hydrocarbons, the improvement which comprises adding thereto from 0.04 to 1.0 gram per liter of the urea solution of a water-soluble wetting agent and from 10 to 60 grams per liter of a substantially neutral water-soluble electrolyte, said wetting agent and electrolyte promoting association of the complex crystals with the aqueous solution and aiding in depressing emulsification, said additions being made prior to said crystalline complex formation.

PHILIP J. GARNER.
LESLIE N. GOLDSBROUGH.
THOMAS B. BUYERS.

REFERENCES CITED

The following references are of record in the file of this patent:

UNITED STATES PATENTS

| Number | Name | Date |
| --- | --- | --- |
| 1,830,859 | Schotte et al. | Nov. 10, 1931 |
| 2,300,134 | Priewe | Oct. 27, 1942 |
| 2,338,384 | Robinson | Jan. 4, 1944 |
| 2,383,768 | Buis et al. | Aug. 28, 1945 |
| 2,411,105 | Nixon et al. | Nov. 12, 1946 |
| 2,428,067 | Evans et al. | Sept. 30, 1947 |
| 2,442,820 | McCormick | June 8, 1948 |

OTHER REFERENCES

Technical Oil Mission (Bengen) Reel 143, translation by Shell Development Co. of German application B 190,197, deposited in Library of Congress, May 22, 1946 (included in index released May 31, 1946).